US010240052B2

(12) United States Patent
Asay et al.

(10) Patent No.: US 10,240,052 B2
(45) Date of Patent: Mar. 26, 2019

(54) SUPERCAPACITOR ELECTRODES INCLUDING GRAPHENIC CARBON PARTICLES

(71) Applicant: PPG Industries Ohio, Inc., Cleveland, OH (US)

(72) Inventors: David B. Asay, Freeport, PA (US); Noel R. Vanier, Wexford, PA (US); Anand K. Atmuri, Monroeville, PA (US); Stuart D. Hellring, Pittsburg, PA (US); Cheng-Hung Hung, Wexford, PA (US); Charles F. Kahle, Pittsburg, PA (US); John W. Burgman, Brecksville, OH (US); Ran Yi, State College, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 14/979,025

(22) Filed: Dec. 22, 2015

(65) Prior Publication Data

US 2016/0111227 A1 Apr. 21, 2016

Related U.S. Application Data

(63) Continuation of application No. PCT/US2015/058277, filed on Oct. 30, 2015, which (Continued)

(51) Int. Cl.
*H01G 11/42* (2013.01)
*C09D 5/24* (2006.01)

(Continued)

(52) U.S. Cl.
CPC ............... *C09D 5/24* (2013.01); *H01G 11/34* (2013.01); *H01G 11/36* (2013.01); *H01G 11/46* (2013.01);

(Continued)

(58) Field of Classification Search
CPC ........ H01G 11/04; H01G 11/32; H01G 11/42; H01G 11/28; H01G 11/66; H01G 11/06; H01G 11/56; H01G 11/50
See application file for complete search history.

(56) References Cited

U.S. PATENT DOCUMENTS 4,851,262 A 7/1989 McFeaters
5,114,477 A 5/1992 Mort et al.

(Continued)

FOREIGN PATENT DOCUMENTS

CN 101974266 A 2/2011
CN 102683034 A 9/2012

(Continued)

OTHER PUBLICATIONS

Bergeron "Production of Carbon by Prolysis of Methane in Thermal Plasma", Master's Thesis is Applied Sciences, University of Sherbrooke, Faculty of Applied Sciences, Department of Chemical Enginering, Quebec, Canada, Oct. 1997.

(Continued)

*Primary Examiner* — Nguyen T Ha
(74) *Attorney, Agent, or Firm* — Alan G. Towner

(57) ABSTRACT

Supercapacitor electrodes comprising active charge supporting particles, graphenic carbon particles, and a binder are disclosed. The active charge supporting particles may comprise activated carbon. The graphenic carbon particles may be thermally produced. The electrodes may further comprise electrically conductive carbon.

15 Claims, 4 Drawing Sheets

10 + 18 14 12 20 16 20 12 18 −

Related U.S. Application Data is a continuation-in-part of application No. 14/348,280, filed as application No. PCT/US2012/057811 on Sep. 28, 2012, now Pat. No. 9,221,688, which is a continuation-in-part of application No. 13/249,315, filed on Sep. 30, 2011, now Pat. No. 8,486,363, and a continuation-in-part of application No. 13/309,894, filed on Dec. 2, 2011, now Pat. No. 8,486,364, which is a continuation-in-part of application No. 13/249,315, filed on Sep. 30, 2011, now Pat. No. 8,486,363.

(60) Provisional application No. 62/073,298, filed on Oct. 31, 2014.

(51) Int. Cl.
*H01G 11/34* (2013.01)
*H01G 11/46* (2013.01)
*H01G 11/36* (2013.01)
*H01G 11/48* (2013.01)

(52) U.S. Cl.
CPC .............. *H01G 11/48* (2013.01); *Y02E 60/13* (2013.01); *Y02T 10/7022* (2013.01)

(56) References Cited

U.S. PATENT DOCUMENTS 5,486,675 A 1/1996 Taylor et al.
5,527,518 A 6/1996 Lynum et al.
5,749,937 A 5/1998 Detering et al.
5,763,548 A 6/1998 Matyjaszewski et al.
5,788,738 A 8/1998 Pirzada et al.
5,789,487 A 8/1998 Matyjaszewski et al.
5,807,937 A 9/1998 Matyjaszewski et al.
5,851,507 A 12/1998 Pirzada et al.
5,935,293 A 8/1999 Detering et al.
5,984,997 A 11/1999 Bickmore et al.
5,989,648 A 11/1999 Phillips
6,099,696 A 8/2000 Schwob et al.
6,228,904 B1 5/2001 Yadav et al.
6,316,119 B1 11/2001 Metzger et al.
6,358,375 B1 3/2002 Schwob
6,441,066 B1 8/2002 Woodworth et al.
RE37,853 E 9/2002 Detering et al.
6,642,301 B2 11/2003 White et al.
6,652,967 B2 11/2003 Yadav et al.
6,669,823 B1 12/2003 Sarkas et al.
6,689,192 B1 2/2004 Phillips et al.
6,710,116 B1 3/2004 Waddell et al.
6,716,525 B1 4/2004 Yadav et al.
6,719,821 B2 4/2004 Yadav et al.
6,786,950 B2 9/2004 Yadav et al.
6,821,500 B2 11/2004 Fincke et al.
6,830,822 B2 12/2004 Yadav
6,849,109 B2 2/2005 Yadav et al.
7,071,258 B1 7/2006 Jang et al.
7,508,650 B1 * 3/2009 Bluvstein .............. H01G 11/38 29/25.03
7,623,340 B1 11/2009 Song et al.
7,632,538 B2 12/2009 Veerasamy
7,635,458 B1 12/2009 Hung et al.
7,754,184 B2 7/2010 Mercuri
7,776,303 B2 8/2010 Hung et al.
7,785,492 B1 8/2010 Jang et al.
7,790,285 B2 9/2010 Zhamu et al.
7,824,741 B2 11/2010 Sandhu
7,842,271 B2 11/2010 Petrik
7,852,613 B2 12/2010 Ma et al.
7,948,739 B2 5/2011 Zhamu et al.
8,047,248 B2 11/2011 Prud'homme et al.
8,048,950 B2 11/2011 Prud'homme et al.
8,083,970 B2 12/2011 Ma et al.
8,129,466 B2 3/2012 Polk et al.
8,211,601 B2 7/2012 Yu et al.
8,486,363 B2 7/2013 Hung et al.
8,486,364 B2 7/2013 Vanier et al.
9,221,688 B2 12/2015 Hung et al.
9,574,094 B2 2/2017 Decker et al.
2002/0114949 A1 8/2002 Bower et al.
2003/0032716 A1 2/2003 White et al.
2004/0247515 A1 12/2004 Gardner
2005/0143327 A1 6/2005 Hirsch
2005/0271574 A1 12/2005 Jang et al.
2006/0093885 A1 5/2006 Krusic et al.
2006/0121279 A1 6/2006 Petrik
2006/0216222 A1 9/2006 Jang
2006/0225615 A1 10/2006 Ramen et al.
2007/0045116 A1 3/2007 Hung et al.
2007/0096066 A1 5/2007 Yoshida et al.
2007/0237705 A1 10/2007 Itoh et al.
2007/0258189 A1 * 11/2007 Tano ...................... H01G 9/058 361/305
2008/0089013 A1 * 4/2008 Zhong ................... C04B 35/532 361/502
2008/0149900 A1 * 6/2008 Jang ....................... H01B 1/122 252/511
2008/0206124 A1 8/2008 Jang et al.
2009/0022649 A1 1/2009 Zhamu et al.
2009/0054581 A1 2/2009 Prud'homme et al.
2009/0068471 A1 3/2009 Choi et al.
2009/0075035 A1 3/2009 O'Brien et al.
2009/0104427 A1 4/2009 Wan et al.
2009/0110627 A1 4/2009 Choi et al.
2009/0117467 A1 5/2009 Zhamu et al.
2009/0169467 A1 7/2009 Zhamu et al.
2009/0272946 A1 * 11/2009 Lu ............................ H01B 1/04 252/511
2010/0000441 A1 1/2010 Jang et al.
2010/0035093 A1 * 2/2010 Ruoff ..................... H01G 11/36 429/493
2010/0036023 A1 2/2010 Weng et al.
2010/0047154 A1 2/2010 Lee et al.
2010/0055017 A1 3/2010 Vanier et al.
2010/0055025 A1 3/2010 Jang et al.
2010/0072430 A1 3/2010 Gergely et al.
2010/0096597 A1 4/2010 Prud'homme et al.
2010/0126660 A1 5/2010 O'Hara
2010/0143798 A1 6/2010 Zhamu et al.
2010/0247801 A1 9/2010 Zenasni
2010/0255219 A1 10/2010 Wenxu et al.
2010/0301212 A1 12/2010 Dato et al.
2010/0303706 A1 12/2010 Wallace et al.
2010/0314788 A1 12/2010 Hung et al.
2010/0323113 A1 12/2010 Ramappa et al.
2011/0046289 A1 2/2011 Zhamu et al.
2011/0070426 A1 3/2011 Vanier et al.
2011/0088931 A1 4/2011 Lettow et al.
2011/0292570 A1 * 12/2011 Ivanovici ............... B82Y 30/00 361/502
2012/0021160 A1 1/2012 Kariyada
2012/0026643 A1 * 2/2012 Yu .......................... H01G 11/02 361/502
2012/0028127 A1 2/2012 Wei et al.
2012/0064409 A1 * 3/2012 Zhamu ................... B82Y 30/00 429/221
2012/0128570 A1 5/2012 Krishnaiah et al.
2012/0142832 A1 6/2012 Varma et al.
2012/0181487 A1 7/2012 Gibon et al.
2012/0211160 A1 8/2012 Asay et al.
2012/0277360 A1 11/2012 Scheffer et al.
2012/0300364 A1 11/2012 Cai et al.
2012/0328953 A1 * 12/2012 Hirohashi ............. B82Y 30/00 429/231.8
2013/0070390 A1 * 3/2013 Lee ........................ H01G 11/32 361/504
2013/0084236 A1 4/2013 Hung et al.
2013/0084237 A1 4/2013 Vanier et al.
2013/0119321 A1 5/2013 Lettow
2013/0171502 A1 * 7/2013 Chen ...................... H01G 11/06 429/149
2013/0197158 A1 8/2013 Kim et al.
2013/0280601 A1 10/2013 Geramita et al.

(56) References Cited

U.S. PATENT DOCUMENTS

| | | | | |
|---|---|---|---|---|
| 2014/0042989 | A1* | 2/2014 | Gogotsi | H01G 11/32 320/167 |
| 2014/0212760 | A1* | 7/2014 | Zhao | H01M 4/583 429/231.8 |
| 2014/0272591 | A1* | 9/2014 | Vanier | H01M 4/364 429/231.8 |
| 2014/0275409 | A1 | 9/2014 | Bendiksen et al. | |
| 2014/0299818 | A1 | 10/2014 | Do et al. | |
| 2015/0058277 | A1 | 2/2015 | Ioannidis et al. | |
| 2015/0159030 | A1 | 6/2015 | Decker et al. | |

FOREIGN PATENT DOCUMENTS

| | | | |
|---|---|---|---|
| CN | 102877109 | A | 1/2013 |
| CN | 103468057 | A | 12/2013 |
| CN | 103956275 | A | 7/2014 |
| DE | 102011003619 | A1 | 8/2012 |
| EP | 0281644 | A1 | 9/1988 |
| EP | 1513026 | A2 | 3/2005 |
| EP | 2562766 | A1 | 2/2013 |
| GB | 1470617 | A | 4/1977 |
| GB | 2483373 | A | 3/2012 |
| JP | 2004325698 | A | 11/2004 |
| JP | 2007012424 | A | 1/2007 |
| KR | 20110089835 | A | 8/2011 |
| KR | 20110093971 | A | 8/2011 |
| KR | 20120029530 | A | 3/2012 |
| KR | 20130013689 | A | 2/2013 |
| KR | 101243296 | B1 | 3/2013 |
| RU | 2160750 | C2 | 12/2000 |
| RU | 2315794 | C1 | 1/2008 |
| WO | 9840415 | A1 | 9/1998 |
| WO | 2005093872 | A1 | 10/2005 |
| WO | WO 2007/050466 | A2 | 5/2007 |
| WO | 2008045778 | A1 | 4/2008 |
| WO | WO 2008/051885 | A1 | 5/2008 |
| WO | 2009099707 | A1 | 8/2009 |
| WO | 2009123771 | A3 | 8/2009 |
| WO | 2009106507 | A2 | 9/2009 |
| WO | 2009134492 | A2 | 11/2009 |
| WO | 2010016976 | A1 | 2/2010 |
| WO | 2010072592 | A1 | 7/2010 |
| WO | 2010107769 | A2 | 9/2010 |
| WO | 2011012874 | A1 | 2/2011 |
| WO | 2011084817 | A1 | 7/2011 |
| WO | 2011086391 | A1 | 7/2011 |
| WO | 2013049498 | A1 | 4/2013 |
| WO | 2013165677 | A1 | 11/2013 |
| WO | 2013166414 | A2 | 11/2013 |
| WO | 2013192180 | A2 | 12/2013 |
| WO | 2014070346 | A1 | 5/2014 |
| WO | 2015089026 | A1 | 6/2015 |

OTHER PUBLICATIONS

Brunaeur et al., “Adsorption of Gases in Multimolecular Layers”, Journal of the American Chemical Society, 1938, vol. 60, pp. 309-313.

Cassagneau et al., “Preparation of Layer-by-Layer Self-Assembly of Silver Nanoparticles Capped by Graphite Oxide Nanosheets”, J. Phys. Chem. B 1999, 103, 1789-1793.

Chen et al., “Oxidation Rsistance of Graphene-Coated Cu and Cu/Ni Alloy”, ACS Nano, Jan. 28, 2011, pp. 1321-1327.

Choi et al., “Fabrication of Free-Standing Multilayered Graphene and Poly(3,4-ethylenedioxythiophene) Composite Films with Enhanced Conductive and Mechanical Properties”, Langmuir, 26 (15), 2010, pp. 12902-12908.

Coraux, “Growth of Graphene on Ir(111)”, New Journal of Physics 11, 2009, 023006, pp. 1-22.

Dato et al., “Substrate-Free Gas-Phase Synthesis of Graphene Sheets”, Nano Letters, vol. 8, No. 7, 2008, pp. 2012-2016.

Dresselhaus et al., “Science of Fullerenes and Carbon Nanotubes”, Academic Press, Inc., 1996, pp. 60-79.

Du et al., “Facile Synthesis of Highly Conductive Polyaniline/Graphite Nanocomposites”, European Polymer Journal 40, 2000, pp. 1489-1493.

Fincke et al., “Plasma Pyrolysis of Methane to Hydrogen and Carbon Black”, Industrial and Engineering Chemistry Research, vol. 41, No. 6, 2002, pp. 1425-1435.

Fitzer et al., “Recommended Terminology for the Description of Carbon as a Solid”, International Union of Pure and Applied Chemistry, Inorganic Chemistry Division, Pure & Applied Chemistry, vol. 67, No. 3, 1995, pp. 473-506.

Gannon, “Acetylene from Hydrocarbons”, Kirk-Othmer Encyclopedia of Chemical Technology, 2003, pp. 1-28.

Gomez De Arco et al., “Synthesis, Transfer, and Devices of Single- and Few-Layer Graphene by Chemical Vapor Deposition”, IEEE Transactions on Nanotechnology, vol. 8, No. 2, Mar. 2009, pp. 135-138.

Gonzalez-Aguilar et al., “Carbon Nanstructures Production by Gas-Phase Plasma Processes at Atmospheric Pressure”, J. Phys. D, Appl. Phys., vol. 40, No. 8, 2007, pp. 2361-2374.

Holmen et al., “High-Temperature Pyrolysis of Hydrocarbons. 1. Methane to Acetylene”, The Norwegian Institute of Technology, University of Trondheim, Ind. Eng. Chem., Process Des. Dev., vol. 15, No. 3, 1976.

Ji et al., “Graphene/Si Multilayer Structure Anodes for Advanced Half and Full Lithium-Ion Cells”, Nano Energy, 2011.

Kang et al., “Effects of Carbonaceous Materials on the Physical and Electrochemical Performance of a LiFePO4 Cathode for Lithium-Ion Batteries” New Carbon Materials, 2011, vol. 26, No.3, pp. 161-170.

Khan et al., “Survey of Recent Methane Pyrolysis Literature”, Industrial and Engineering Chemistry, vol. 62, No. 10, Oct. 1970.

Kim et al., “Fabrication of Graphene Flakes Composed of Multi-Layer Graphene Sheets using a Thermal Plasma Jet System”, Nanotechnology 21, Jan. 29, 2010.

Kim et al., “Continuous Synthesis of Nanostructured Sheetlike Carbons by Thermal Plasma Decomposition of Methane”, IEEE Transactions on Plasma Science, vol. 35, No. 2, Apr. 2007.

Kostic et al., “Thermodynamic Consideration of B-O-C-H System for Boron Carbide (B4C) Powder Synthesis in Thermal Plasma”, Progress in Plasma Processing of Materials, 1997, pp. 889-898.

Lavoie, “Synthesis of Carbon Black from Propane Using a Thermal Plasma”, Master's Thesis in Applied Sciences, University of Sherbrooke, Faculty of Applied Sciences, Department of Chemical Engineering, Quebec, Canada, Sep. 1997.

Malesevic et al., “Synthesis of Few-Layer Graphene via Microwave Plasma-Enhanced Chemical Vapour Deposition”, Nanotechnology 2008, vol. 19, No. 30, 305604 (6 pps).

Martin-Gallego et al., “Epoxy-Graphene UV-Cured Nanocomposites”, Polymer, vol. 52, 2011, pp. 4664-4669.

McWilliams, “Graphene: Technologies, Applications, and Markets”, BCC Research Report , Feb. 2011.

Nandamuri et al., “Chemical Vapor Deposition of Graphene Films”, Nanotechnology 21, 2010, 145604 (4 pp.).

Prasai et al., “Graphene: Corrosion-Inhibiting Coating”, ACS Nano, 6 (2), 2012, pp. 1102-1108.

Pristavita et al., “Carbon Blacks Produced by Thermal Plasma: the Influence of the Reactor Geometry on the Product Morphology”, Plasma Chem. Plasma Process, 30, 2010, pp. 267-279.

Pristavita et al., “Carbon Nanoparticle Production by Inductively Coupled Thermal Plasmas: Controlling the Thermal History of Particle Nucleation”, Plasma Chem. Plasma Process, 31, 2011, pp. 851-866.

Pristavita et al., “Carbon Nano-Flakes Produced by an Inductively Coupled Thermal Plasma System for Catalyst Applications”, Plasma Chem. Plasma Process, 31, 2011, pp. 393-403 .

Rafiee et al., “Enhanced Mechanical Properties of Nanocomposites at Low Graphene Content”, ACSNANO, vol. 3, No. 12, 2009.

Skinner, “Prolysis of Methane and the C2 Hydrocarbons”, Monsanto Chemical Co., Research and Engineering Division, Dayton 7, Ohio, pp. 59-68.

Soldano et al., “Production Properties and Potential of Graphene”, Carbon, vol. 48, 2010, pp. 1-57.

(56) References Cited

OTHER PUBLICATIONS

Su et al., "Could Graphene Construct an Effective Conducting Network in a High-Power Lithium Ion Battery?", Nano Energy, Feb. 25, 2012.
Su et al., "Flexible and Planar Graphene Conductive Additives for Lithium-Ion Batteries", J. Mater. Chem., 20, 2010, pp. 9644-9650.
Subrahmanyam et al., "Simple Method of Preparing Graphene Flakes by an Arc-Discharge Method", The Journal of Physical Chemistry C, vol. 113, No. 11, 2009, pp. 4257-4259.
Tagawa et al., "Production Processes for Fabrication of Lithium-Ion Batteries", Lithium-Ion Batteries, 2009, Chapter B, Springer, NY, pp. 181-194.
Tang et al., Processible Nanostructured Materials with Electrical Conductivity and Magnetic Susceptibility: Preparation and Properties of Maghemite/Polyaniline Nanocomposite Films, Chem. Mater., 1999, 11, 1581-1589.
Verdejo et al, "Functionalized graphene sheet filled silicone foam nanocomposites", Journal of Materials Chemistry, Mar. 19, 2008, The Royal Society of Chemistry, vol. 18, pp. 2221-2226.
Yun et al., "Thermal Conductivity and Interconnectivity of Hexamethylene Diisocynate Contained Polyerethane Grafted Multiwall Carbon Nanotube/Polyurethane Nanocomposite Film", Materials Tranasactions, Jan. 26, 2011, The Japan Institute of Metals, vol. 52, No. 3, pp. 564-567.
Zhong et al., "Catalytic Growth of Carbon Nanoballs With and Without Cobalt Encapsulation", Cemical Physics Letters 330, 2000, pp. 41-47.
Matsumoto et al., "Perfect blackbody radiation from a graphene nanostructure with application to high-temperature spectral emissivity measurements", Optics Express, vol. 21, No. 25, Dec. 2013, DOI: 10.1364/OE.21.030964, pp. 30964-30974.

* cited by examiner

SUPERCAPACITOR ELECTRODES INCLUDING GRAPHENIC CARBON PARTICLES

CROSS REFERENCE TO RELATED APPLICATION

This application is a continuation of PCT International Patent Application Serial No. PCT/US2015/058277 filed Oct. 30, 2015, which claims the benefit of U.S. Provisional Application Ser. No. 62/073,298 filed Oct. 31, 2014. This application is also a continuation-in-part of U.S. patent application Ser. No. 14/348,280 filed Mar. 28, 2014, to be issued as U.S. Pat. No. 9,221,688 on Dec. 29, 2015, which is a national phase of PCT International Patent Application Serial No. PCT/US2012/057811 filed Sep. 28, 2012. PCT International Patent Application Serial No. PCT/US2012/057811 is a continuation-in-part of U.S. patent application Ser. No. 13/249,315 filed Sep. 30, 2011, now U.S. Pat. No. 8,486,363 issued Jul. 16, 2013, and is also a continuation-in-part of U.S. patent application Ser. No. 13/309,894 filed Dec. 2, 2011, now U.S. Pat. No. 8,486,364 issued Jul. 16, 2013. U.S. patent application Ser. No. 13/309,894 filed Dec. 2, 2011 is a continuation-in-part of U.S. patent application Ser. No. 13/249,315 filed Sep. 30, 2011. All of these applications are incorporated herein by reference.

FIELD OF THE INVENTION

The present invention relates to the use of graphenic carbon particles in supercapacitor electrodes.

BACKGROUND OF THE INVENTION

A large demand exists for high-power energy resources for use in various products such as portable electronic devices and electric vehicles. Supercapacitors offer a promising alternative to conventional capacitors and batteries for such uses. Compared with conventional capacitors, the specific energy of supercapacitors can be several orders of magnitude higher. In addition, supercapacitors are able to store energy and deliver power at relatively high rates beyond those accessible with batteries.

SUMMARY OF THE INVENTION

An aspect of the invention provides a supercapacitor electrode comprising: a conductive foil substrate layer; and electrode coating layers on opposite sides of the conductive foil substrate layer, wherein each electrode coating layer comprises: active charge supporting particles; graphenic carbon particles; and a binder. A supercapacitor comprising such an electrode is also provided.

Another aspect of the invention provides an electrode coating comprising: from 50 to 95 weight percent active carbon particles; from 1 to 10 weight percent thermally produced graphenic carbon particles; and from 1 to 15 weight percent binder.

DETAILED DESCRIPTION

Figure 1:
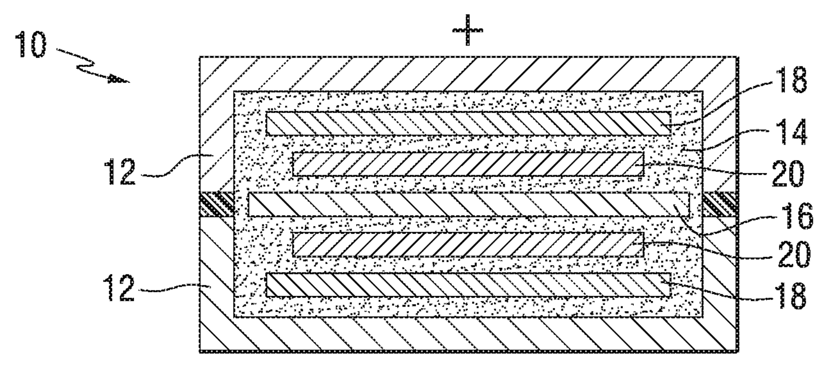
FIG. 1 is a partially schematic side view of a supercapacitor in the form of a test coin cell including electrodes comprising graphenic carbon particles in accordance with an embodiment of the present invention.

FIG. 1 schematically illustrates a supercapacitor in the form of a test coin cell 10 including a stainless steel case 12 with two parts separated by an insulator ring, electrolyte 14, separator 16, spacers 18 and electrodes 20. In accordance with embodiments of the invention, one or more of the electrodes 20 may include graphenic carbon particles. The other components of the test coin cell capacitor 10, such as the electrolyte 14, separator 16 and spacers 18 may be made of any suitable conventional materials, as known to those skilled in the art.

Figure 2:
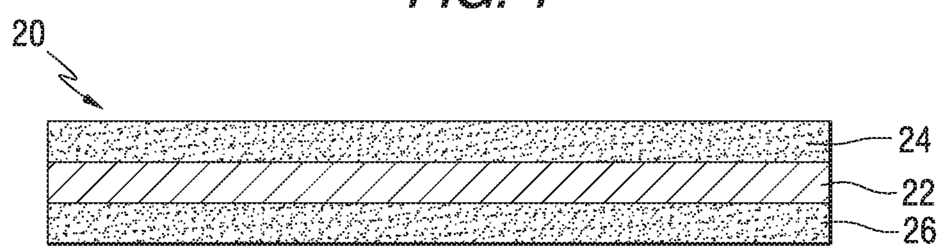
FIG. 2 is a partially schematic side sectional view of a supercapacitor electrode in accordance with an embodiment of the present invention comprising a conductive foil layer with electrode coating layers on opposite sides thereof.

As schematically shown in FIG. 2, a supercapacitor electrode 20 includes a conductive foil layer 22 having electrode coating layers 24 and 26 applied on opposite sides thereof. The conductive foil layer 22 may be made of any suitable conductive material such as aluminum or the like. The conductive foil layer 22 may have any suitable thickness, for example, from 5 to 25 microns, or from 10 to 20 microns. In a particular embodiment, the conductive foil layer 22 comprises aluminum foil having a thickness of about 15 microns.

Each of the electrode layers 24 and 26 shown in FIG. 2 may have any suitable thicknesses, typically from 5 to 200 microns, e.g., from 10 to 120 microns, or from 20 to 100 microns. In the embodiment shown in FIG. 2, each of the electrode coating layers 24 and 26 have the same thicknesses. However, the layers 24 and 26 may have different thicknesses in certain embodiments.

In accordance with embodiments of the present invention, graphenic carbon particles are included in the electrode coating layers 24 and 26. Graphenic carbon particles have large specific surface area and exceptionally high electronic qualities, making such particles useful in supercapacitor applications. The graphenic carbon particles may be combined with active charge supporting particles such as activated carbon and/or transition metal oxides for use in supercapacitor electrodes. Additional electrically conductive particles such as carbon black may optionally be added to such electrode materials. In certain embodiments, the electrode coating layers 24 and 26 include active charge supporting particles, graphenic carbon particles, and a binder, as more fully described below.

As used herein, the term "supercapacitor" means capacitors having capacitance values greater than 1,000 farads at 1.2 volt. Supercapacitor electrodes of the present invention have been found to provide significantly improved capacitive properties such as specific capacitance. Specific capacitance is the capacitance per unit mass for one electrode and is calculated by the following equation:

$$C_{sp}(F/g)=4It/Vm$$

where I is the discharge current (A), t is the discharge duration (second), V is the voltage window (V) and m is the total mass (g) of the active material in both electrodes.

In accordance with certain embodiments, each supercapacitor electrode 20 has a specific capacitance of at least 75 F/g at a current density of 1 A/g for relatively thin electrodes with a mass loading of 1 $mg/cm^2$ of active material per electrode, for example, at least 100 F/g, or at least 110 F/g. Furthermore, in accordance with embodiments of the present invention, the supercapacitor electrodes 20 may have a typical specific energy density of at least 1 Wh/kg, or at least 2 Wh/kg. For example, the specific energy density of each electrode 20 may range from 2 to 20 Wh/kg or from 6 to 15 Wh/kg.

In certain embodiments, the electrode coating layers 24 and 26 of the supercapacitor electrodes 20 include active charge supporting particles comprising activated carbon. The activated carbon particles typically comprise from 50 to 95 weight percent of the electrode coating material, for example, from 60 to 90 percent activated carbon, or from 70 to 85 percent activated carbon. In a particular embodiment, the activated carbon comprises 80 weight percent of the electrode coating material. The activated carbon particles may be of any suitable size, for example, the average particle size of the activated carbon particles may typically range from 0.5 to 50 microns, or from 1 to 10 microns.

Graphenic carbon particles may be added with the activated carbon particles in the conductive coating material in typical amounts of from 0.5 to 20 weight percent of the conductive coating material, for example, from 1 to 15 weight percent or from 2 to 10 weight percent.

While some commercial supercapacitors have used activated carbon, which has advantages of low cost and high capacitance at low current densities, it suffers from poor retention of specific capacitance at high current densities due to the low electrical conductivity deriving from its highly amorphous nature. This limits the power density of supercapacitors with activated carbon electrodes. In accordance with embodiments of the invention, the superior electrical conductivity and unique structure of graphenic carbon particles make it a superior additive for activated carbon by acting as conductive bridges between activated carbon particles, thereby improving the conductivity and power density of activated carbon.

In addition to the activated carbon and graphenic carbon particles, the electrode coating compositions may include a binder in a typical amount of up to 20 weight percent, for example, from 1-15 weight percent, or from 2-10 weight percent. Any suitable binder may be used, such as vinyls, latexes, acrylates, cellulosic binders, and conductive polymers. For example, the binder may comprise polyvinylidene fluoride (PVDF), styrene-butadiene rubber (SBR) latex, sodium carboxymethyl cellulose (CMC), polyaniline, polyacrylonitrile or the like. The binder may be used as a solid in a powder coating formulation, or in a liquid coating formulation as a dispersion in a solvent or as a dissolved binder material.

In certain embodiments, conductive carbon black may be added with the activated carbon and graphenic carbon particles in the conductive coating material in typical amounts of up to 20 weight percent based on the weight of the electrode coating composition, for example, from 1 to 15 weight percent, or from 2 to 10 weight percent, or from 5 to 8 weight percent. Typical average particle sizes of the conductive carbon black typically range from 0.5 to 50 microns, for example, from 1 to 10 microns.

In embodiments in which graphenic carbon particles and conductive carbon black are used, the relative weight percentages thereof may be controlled. For example, the graphenic carbon particles may comprise from 20 to 80 weight percent of the combined weight of the graphenic carbon particles and conductive carbon black, for example, from 20 to 50 weight percent. The conductive carbon black may typically comprise from 20 to 80 weight percent of the combined weight of the graphenic carbon particles and conductive carbon black, for example, from 50 to 80 weight percent.

In certain embodiments, the active charge supporting particles may comprise transition metal oxides such as manganese oxide ($MnO_2$), iron oxide ($Fe_2O_3$, $Fe_3O_4$), and the like. In this embodiment, the transition metal oxide particles may typically comprise 40 to 90 weight percent of the total weight of the electrode coating, for example, from 60 to 80 weight percent. When such transition metal oxides are used, the amount of graphenic carbon particles may typically range from 10 to 60 weight percent, for example, from 20 to 40 weight percent. Typical average particles sizes of the transition metal oxide particles may range from 0.05 to 10 microns, for example, from 0.1 to 2 microns.

In certain embodiments, the active charge supporting particles, graphenic carbon particles, binder and optional conductive carbon black particles are dispersed in a solvent and applied to the conductive foil substrate layer 22 by a coating process and converted into a dry film 24, 26 before being used in a supercapacitor. Conversion from a liquid formulation or a powder formulation into a dry and cured film may be accomplished by any suitable method such as oven heating.

In accordance with other embodiments of the invention, the graphenic carbon particles may be used as the sole active material of the electrode coatings the amount of graphenic carbon particles present in the supercapacitor electrode material, as a sole active material may typically range from 60 to 98 weight percent, for example, from 80 to 95 weight percent, or from 85 to 90 weight percent.

As used herein, the term “graphenic carbon particles” means carbon particles having structures comprising one or more layers of one-atom-thick planar sheets of $sp^2$-bonded carbon atoms that are densely packed in a honeycomb crystal lattice. The average number of stacked layers may be less than 100, for example, less than 50. In certain embodiments, the average number of stacked layers is 30 or less, such as 20 or less, 10 or less, or, in some cases, 5 or less. The graphenic carbon particles may be substantially flat, however, at least a portion of the planar sheets may be substantially curved, curled, creased or buckled. The particles typically do not have a spheroidal or equiaxed morphology.

In certain embodiments, the graphenic carbon particles have a thickness, measured in a direction perpendicular to the carbon atom layers, of no more than 10 nanometers, no more than 5 nanometers, or, in certain embodiments, no more than 4 or 3 or 2 or 1 nanometers, such as no more than 3.6 nanometers. In certain embodiments, the graphenic carbon particles may be from 1 atom layer up to 3, 6, 9, 12, 20 or 30 atom layers thick, or more. In certain embodiments, the graphenic carbon particles have a width and length, measured in a direction parallel to the carbon atoms layers, of at least 50 nanometers, such as more than 100 nanometers, in some cases more than 100 nanometers up to 500 nanometers, or more than 100 nanometers up to 200 nanometers. The graphenic carbon particles may be provided in the form of ultrathin flakes, platelets or sheets having relatively high aspect ratios (aspect ratio being defined as the ratio of the longest dimension of a particle to the shortest dimension of the particle) of greater than 3:1, such as greater than 10:1.

In certain embodiments, the graphenic carbon particles have relatively low oxygen content. For example, the graphenic carbon particles may, even when having a thickness of no more than 5 or no more than 2 nanometers, have an oxygen content of no more than 2 atomic weight percent, such as no more than 1.5 or 1 atomic weight percent, or no more than 0.6 atomic weight, such as about 0.5 atomic weight percent. The oxygen content of the graphenic carbon particles can be determined using X-ray Photoelectron Spectroscopy, such as is described in D. R. Dreyer et al., Chem. Soc. Rev. 39, 228-240 (2010).

In certain embodiments, the graphenic carbon particles have a B.E.T. specific surface area of at least 50 square meters per gram, such as 70 to 1000 square meters per gram, or, in some cases, 200 to 1000 square meters per grams or 200 to 400 square meters per gram. As used herein, the term "B.E.T. specific surface area" refers to a specific surface area determined by nitrogen adsorption according to the ASTMD 3663-78 standard based on the Brunauer-Emmett-Teller method described in the periodical "The Journal of the American Chemical Society", 60, 309 (1938).

In certain embodiments, the graphenic carbon particles have a Raman spectroscopy 2D/G peak ratio of at least 1:1, for example, at least 1.2:1 or 1.3:1. As used herein, the term "2D/G peak ratio" refers to the ratio of the intensity of the 2D peak at 2692 $cm^{-1}$ to the intensity of the G peak at 1,580 $cm^{-1}$.

In certain embodiments, the graphenic carbon particles have a relatively low bulk density. For example, the graphenic carbon particles are characterized by having a bulk density (tap density) of less than 0.2 $g/cm^3$, such as no more than 0.1 $g/cm^3$. For the purposes of the present invention, the bulk density of the graphenic carbon particles is determined by placing 0.4 grams of the graphenic carbon particles in a glass measuring cylinder having a readable scale. The cylinder is raised approximately one-inch and tapped 100 times, by striking the base of the cylinder onto a hard surface, to allow the graphenic carbon particles to settle within the cylinder. The volume of the particles is then measured, and the bulk density is calculated by dividing 0.4 grams by the measured volume, wherein the bulk density is expressed in terms of $g/cm^3$.

In certain embodiments, the graphenic carbon particles have a compressed density and a percent densification that is less than the compressed density and percent densification of graphite powder and certain types of substantially flat graphenic carbon particles such as those formed from exfoliated graphite. Lower compressed density and lower percent densification are each currently believed to contribute to better dispersion and/or rheological properties than graphenic carbon particles exhibiting higher compressed density and higher percent densification. In certain embodiments, the compressed density of the graphenic carbon particles is 0.9 or less, such as less than 0.8, less than 0.7, such as from 0.6 to 0.7. In certain embodiments, the percent densification of the graphenic carbon particles is less than 40%, such as less than 30%, such as from 25 to 30%.

For purposes of the present invention, the compressed density of graphenic carbon particles is calculated from a measured thickness of a given mass of the particles after compression. Specifically, the measured thickness is determined by subjecting 0.1 grams of the graphenic carbon particles to cold press under 15,000 pound of force in a 1.3 centimeter die for 45 minutes, wherein the contact pressure is 500 MPa. The compressed density of the graphenic carbon particles is then calculated from this measured thickness according to the following equation:

$$\text{Compressed Density (g/cm}^3\text{)} = \frac{0.1\text{ grams}}{\Pi * (1.3\text{ cm}/2)^2 * (\text{measured thickness in cm})}$$

The percent densification of the graphenic carbon particles is then determined as the ratio of the calculated compressed density of the graphenic carbon particles, as determined above, to 2.2 $g/cm^3$, which is the density of graphite.

In certain embodiments, the graphenic carbon particles have a measured bulk liquid conductivity of at least 100 microSiemens, such as at least 120 microSiemens, such as at least 140 microSiemens immediately after mixing and at later points in time, such as at 10 minutes, or 20 minutes, or 30 minutes, or 40 minutes. For the purposes of the present invention, the bulk liquid conductivity of the graphenic carbon particles is determined as follows. First, a sample comprising a 0.5% solution of graphenic carbon particles in butyl cellosolve is sonicated for 30 minutes with a bath sonicator. Immediately following sonication, the sample is placed in a standard calibrated electrolytic conductivity cell (K=1). A Fisher Scientific AB 30 conductivity meter is introduced to the sample to measure the conductivity of the sample. The conductivity is plotted over the course of about 40 minutes.

In accordance with certain embodiments, percolation, defined as long range interconnectivity, occurs between the conductive graphenic carbon particles. Such percolation may reduce the resistivity of the coating compositions. The conductive graphenic particles may occupy a minimum volume within the coating such that the particles form a continuous, or nearly continuous, network. In such a case, the aspect ratios of the graphenic carbon particles may affect the minimum volume required for percolation.

In certain embodiments, at least a portion of the graphenic carbon particles to be dispersed in the compositions of the present invention are may be made by thermal processes. In accordance with embodiments of the invention, thermally produced graphenic carbon particles are made from carbon-containing precursor materials that are heated to high temperatures in a thermal zone such as a plasma. As more fully described below, the carbon-containing precursor materials are heated to a sufficiently high temperature, e.g., above 3,500° C., to produce graphenic carbon particles having characteristics as described above. The carbon-containing precursor, such as a hydrocarbon provided in gaseous or liquid form, is heated in the thermal zone to produce the graphenic carbon particles in the thermal zone or downstream therefrom. For example, thermally produced graphenic carbon particles may be made by the systems and methods disclosed in U.S. Pat. Nos. 8,486,363 and 8,486,364.

In certain embodiments, the thermally produced graphenic carbon particles may be made by using the apparatus and method described in U.S. Pat. No. 8,486,363 at [0022] to [0048] in which (i) one or more hydrocarbon precursor materials capable of forming a two-carbon fragment species (such as n-propanol, ethane, ethylene, acetylene, vinyl chloride, 1,2-dichloroethane, allyl alcohol, propionaldehyde, and/or vinyl bromide) is introduced into a thermal zone (such as a plasma), and (ii) the hydrocarbon is heated in the thermal zone to form the graphenic carbon particles. In other embodiments, the thermally produced graphenic carbon particles may be made by using the apparatus and method described in U.S. Pat. No. 8,486,364 at [0015] to [0042] in which (i) a methane precursor material (such as a material comprising at least 50 percent methane, or, in some cases, gaseous or liquid methane of at least 95 or 99 percent purity or higher) is introduced into a thermal zone (such as a plasma), and (ii) the methane precursor is heated in the thermal zone to form the graphenic carbon particles. Such methods can produce graphenic carbon particles having at least some, in some cases all, of the characteristics described above.

During production of the graphenic carbon particles by the thermal production methods described above, a carbon-containing precursor is provided as a feed material that may be contacted with an inert carrier gas. The carbon-containing precursor material may be heated in a thermal zone, for example, by a plasma system. In certain embodiments, the precursor material is heated to a temperature of at least 3,500° C., for example, from a temperature of greater than 3,500° C. or 4,000° C. up to 10,000° C. or 20,000° C. Although the thermal zone may be generated by a plasma system, it is to be understood that any other suitable heating system may be used to create the thermal zone, such as various types of furnaces including electrically heated tube furnaces and the like.

The gaseous stream may be contacted with one or more quench streams that are injected into the plasma chamber through at least one quench stream injection port. The quench stream may cool the gaseous stream to facilitate the formation or control the particle size or morphology of the graphenic carbon particles. In certain embodiments of the invention, after contacting the gaseous product stream with the quench streams, the ultrafine particles may be passed through a converging member. After the graphenic carbon particles exit the plasma system, they may be collected. Any suitable means may be used to separate the graphenic carbon particles from the gas flow, such as, for example, a bag filter, cyclone separator or deposition on a substrate.

In certain embodiments, at least a portion of the graphenic carbon particles may be obtained from commercial sources, for example, from Angstron, XG Sciences and other commercial sources. In such embodiments, the commercially available graphenic carbon particles may comprise exfoliated graphite and have different characteristics in comparison with the thermally produced graphenic carbon particles, such as different size distributions, thicknesses, aspect ratios, structural morphologies, oxygen contents, and chemical functionalities at the basal planes/edges.

In certain embodiments, different types of graphenic carbon particles may be co-dispersed in the composition. For example, when thermally produced graphenic carbon particles are combined with commercially available graphenic carbon particles in accordance with embodiments of the invention, a bi-modal distribution, tri-modal distribution, etc. of graphenic carbon particle characteristics may be achieved. The graphenic carbon particles contained in the compositions may have multi-modal particle size distributions, aspect ratio distributions, structural morphologies, edge functionality differences, oxygen content, and the like.

In an embodiment of the present invention in which both thermally produced graphenic carbon particles and commercially available graphenic carbon particles, e.g., from exfoliated graphite, are co-dispersed and added to a coating composition to produce a bi-modal graphenic particle size distribution, the relative amounts of the different types of graphenic carbon particles are controlled to produce desired conductivity properties of the coatings. For example, the thermally produced graphenic particles may comprise from 1 to 50 weight percent, and the commercially available graphenic carbon particles may comprise from 50 to 99 weight percent, based on the total weight of the graphenic carbon particles. In certain embodiments, the thermally produced graphenic carbon particles may comprise from 2 or 4 to 40 weight percent, or from 6 or 8 to 35 weight percent, or from 10 to 30 weight percent. When co-dispersions of the present invention having such relative amounts of thermally produced graphenic carbon particles and commercially available graphenic carbon particles are incorporated in coatings, inks, or other materials, such materials may exhibit significantly increased electrical conductivities in comparison with similar materials containing mixtures of such types of graphenic carbon particles at similar ratios. For example, the co-dispersions may increase electrical conductivity by at least 10 or 20 percent compared with the mixtures. In certain embodiments, the electrical conductivity may be increased by at least 50, 70 or 90 percent, or more.

In certain embodiments, the graphenic carbon particles are functionalized. As used herein, "functionalized", when referring to graphenic carbon particles, means covalent bonding of any non-carbon atom or any organic group to the graphenic carbon particles. The graphenic carbon particles may be functionalized through the formation of covalent bonds between the carbon atoms of a particle and other chemical moieties such as carboxylic acid groups, sulfonic acid groups, hydroxyl groups, halogen atoms, nitro groups, amine groups, aliphatic hydrocarbon groups, phenyl groups and the like. For example, functionalization with carbonaceous materials may result in the formation of carboxylic acid groups on the graphenic carbon particles. The graphenic carbon particles may also be functionalized by other reactions such as Diels-Alder addition reactions, 1,3-dipolar cycloaddition reactions, free radical addition reactions and diazonium addition reactions. In certain embodiments, the hydrocarbon and phenyl groups may be further functionalized. If the graphenic carbon particles already have some hydroxyl functionality, the functionality can be modified and extended by reacting these groups with, for example, an organic isocyanate.

The following examples are intended to illustrate various aspects of the invention, and are not intended to limit the scope of the invention.

Example 1

A coin cell configuration as shown in FIG. 1 was used to represent the physical configuration, internal voltages and charge transfer that occurs in a packaged supercapacitor in order to provide an indication of the performance of the electrode material. Two identical electrodes with the same mass loading were used for testing. The electrodes included thermally produced graphenic carbon particles as the sole active material (80 wt %), conductive carbon black (10 wt %) and a PVDF binder (10 wt %) applied on opposite sides of an aluminum foil layer. The electrolyte was KCl in water.

Figure 3:
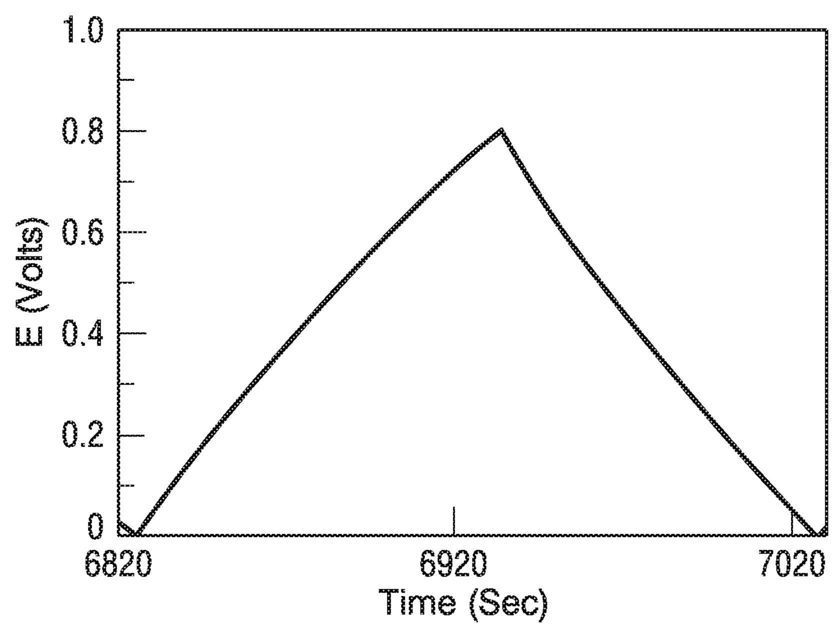
FIG. 3 is a graph illustrating linear charge and discharge characteristics of a supercapacitor test coin cell comprising electrodes with graphenic carbon particles as the active component of the electrode coating layers.

FIG. 3 shows the typical charge/discharge curve at 100 mA/g of thermally produced graphenic carbon particles with specific surface area (SSA) of 416 $m^2/g$. The charge curve and discharge curves are nearly linear, indicating ideal capacitive behaviors. The specific capacitance of thermally produced graphenic carbon particles is 25 F/g, which is lower than commercial active carbons with SSA ranging from 1,000 to 3,500 $m^2/g$. However, the theoretical specific capacitance of the thermally produced graphenic carbon particles is calculated to be 88 F/g (416/2600*550), which is higher than the measured specific capacitance.

Example 2

To investigate the effects of thermally produced graphenic carbon particles in electrodes comprising activated carbon, six samples including those with different ratios of thermally produced graphenic carbon particles (TPGC) and Super C conductive carbon black, and commercial graphenic carbon particles as comparisons (Table 1) were prepared and tested. The active charge supporting particles of each electrode were commercially available YP-80F activated carbon particles. The specific capacitance is calculated based on the mass of activated carbon only.

Table 2 shows the performance of thin electrodes with mass loading of 1 $mg/cm^2$ per electrode and typical thickness of 15 μm. In general, introduction of graphenic carbon particles increases specific capacitance and decreases internal resistance (IR) compared to pure conductive carbon at both low and high current densities. The difference is more striking at a high current density of 1 A/g. Sample 3 with 5 wt % thermally produced graphenic carbon particles delivers a capacitance of 112 F/g, which doubles that of pure conductive carbon (55 F/g). Increasing the thermally produced graphenic carbon particles to higher loading adversely affects the performance as demonstrated by sample 4 due to decreased conductivity. The preferred mass content of thermally produced graphenic carbon particles should be in the range of about 2 to 5 weight percent. The electrode including commercially available M5 graphene produced acceptable results, but the electrode including commercially available C300 graphene produced less favorable results.

TABLE 1

Formulas of Electrode Coatings

| Sample | YP-80F (g) | Graphene (g) | Super C (g) | 2 wt % PVDF/NMP (g) |
|---|---|---|---|---|
| 1 | 0.8 | 0 | 0.1 | 5 |
| 2 | 0.8 | TPGC 0.02 | 0.08 | 5 |
| 3 | 0.8 | TPGC 0.05 | 0.05 | 5 |
| 4 | 0.8 | TPGC 0.08 | 0.02 | 5 |
| 5 | 0.8 | M5 0.05 | 0.05 | 5 |
| 6 | 0.8 | C300 0.05 | 0.05 | 5 |

TABLE 2

Performance of Thin Electrodes

| Sample | Capacitance (F/g) | | IR drop (V) | |
|---|---|---|---|---|
| | 0.1 A/g | 1 A/g | 0.1 A/g | 1 A/g |
| 1 | 102 | 55 | 0.02 | 0.22 |
| 2 | 145 | 108 | 0.01 | 0.11 |
| 3 | 150 | 112 | 0.01 | 0.11 |
| 4 | 132 | 75 | 0.02 | 0.23 |

TABLE 2-continued

Performance of Thin Electrodes

| Sample | Capacitance (F/g) | | IR drop (V) | |
|---|---|---|---|---|
| | 0.1 A/g | 1 A/g | 0.1 A/g | 1 A/g |
| 5 | 131 | 108 | 0.01 | 0.06 |
| 6 | 146 | 67 | 0.02 | 0.29 |

Example 3

Figure 4:
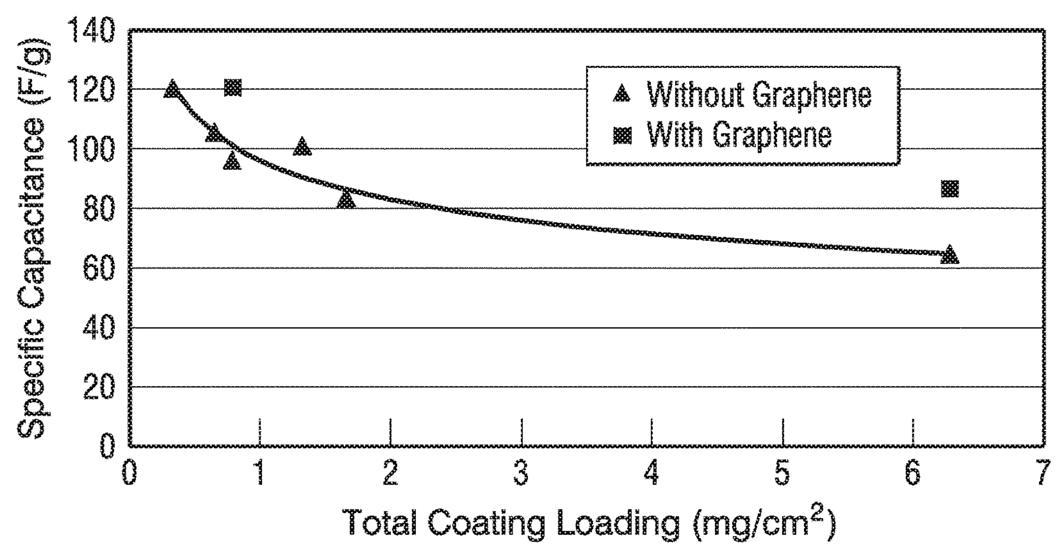
FIG. 4 is a graph of specific capacitance versus total coating loading for electrodes including activated carbon particles alone or in combination with graphenic carbon particles.

Relatively thick electrodes were fabricated and evaluated. Carbon-coated Al foil (from Exopack) was used to enhance the adhesion. The electrodes have mass loadings of about 6.0 $mg/cm^2$ and thicknesses of about 115 μm. Overall, each electrode has lower capacitance at the same current density compared to its thin counterpart. As shown in Table 3 and FIG. 4, pure conductive carbon exhibits a low capacitance of 63.5 F/g at $1^{st}$ cycle and has severe fading. In addition, the IR drop is large and increases upon cycling. In contrast, conductive carbon with thermally produced graphenic carbon particles shows higher capacitance with stable cyclability and much lower IR drop. Electrodes with thermally produced graphenic carbon particles also show higher capacitance at a high current density of 1 A/g. Similar results were obtained with the electrodes including commercially available M5 and C300 graphene. The electrode with 8 weight percent thermally produced graphenic carbon particles has the lowest capacitance and highest IR drop among electrodes with thermally produced graphenic carbon particles, which confirms that the optimal thermally produced graphenic carbon particles content should range from about 2 to 5 weight percent.

TABLE 3

Performance of Thick Electrodes

| Sample | Mass loading ($mg/cm^2$) | Capacitance (F/g) | IR drop (V) |
|---|---|---|---|
| 1 | 6.3 | 63.5 ($1^{st}$)<br>40 ($30^{th}$) | 0.23 ($1^{st}$)<br>0.42 ($30^{th}$) |
| 2 | 6.4 | 87 | 0.06 |
| 3 | 6.0 | 87 | 0.08 |
| 4 | 6.3 | 84 | 0.09 |
| 5 | 7.1 | 72 | 0.07 |
| 6 | 6.0 | 84 | 0.1 |

Example 4

Thick electrodes of the same composition were also made and tested using a different carbon-coated Al foil (from MTI). As shown in Table 4, the difference between graphenic carbon particle-free and thermally produced graphenic carbon particle-containing electrodes is less pronounced in terms of capacitance. However, the electrode with 2 weight percent thermally produced graphenic carbon particles (Sample 2) shows lower IR drop at both low and high current densities than graphenic carbon particle-free electrode (sample 1), indicating an improvement in conductivity of the electrode.

TABLE 4

Performance of Thick Electrodes

| Sample | Mass loading (mg/cm$^2$) | Capacitance (F/g) 0.1 A/g | Capacitance (F/g) 1 A/g | IR drop (V) 0.1 A/g | IR drop (V) 1 A/g |
|---|---|---|---|---|---|
| 1 | 5.8 | 90 | 80 | 0.01 | 0.1 |
| 2 | 5.8 | 90 | 80 | <0.01 | 0.06 |
| 3 | 6 | 93 | 74 | 0.013 | 0.12 |
| 4 | 5.9 | 83 | 45 | 0.028 | 0.3 |
| 5 | 6.3 | 84 | 71 | 0.01 | 0.1 |
| 6 | 6.1 | 88 | 53 | 0.014 | 0.14 |

Figure 5:
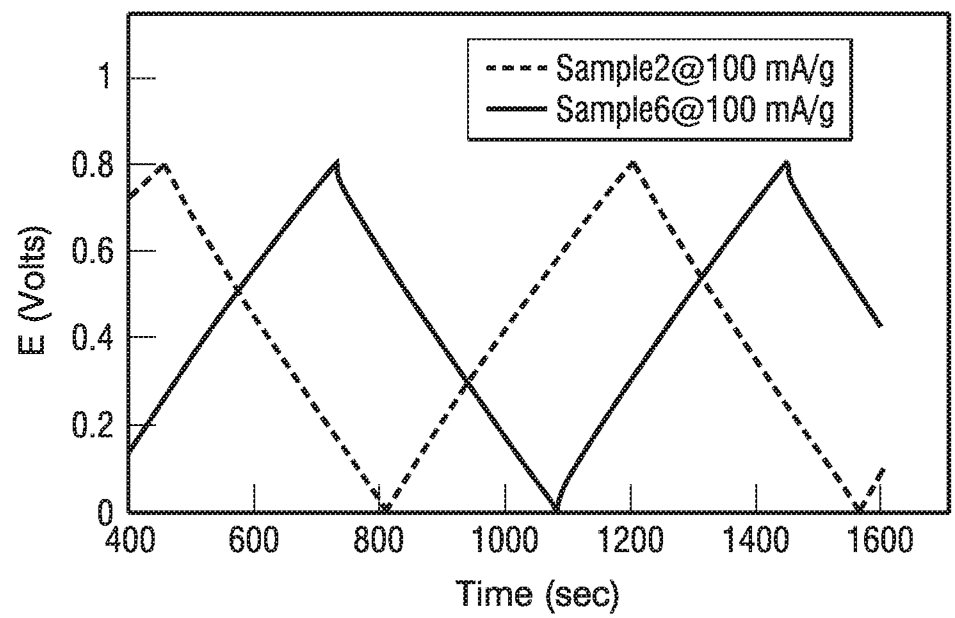
FIG. 5 is a graph of applied voltage versus time for electrodes including activated carbon particles and different types of graphenic carbon particles.
Figure 6:
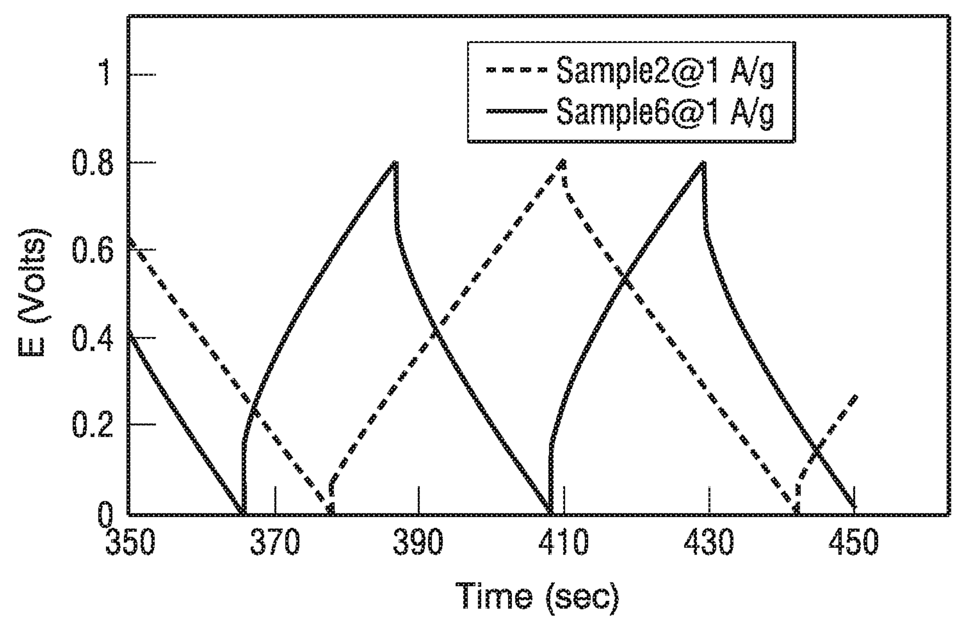
FIG. 6 is a graph of applied voltage versus time for electrodes including activated carbon particles and different types of graphenic carbon particles.

FIGS. 5 and 6 show charge/discharge curves of electrodes made of Samples 2 and 6 (Table 4). As shown in FIG. 5, at low current density (100 mA/g) both of the samples show symmetric charge and discharge cycles, but with Sample 2 showing a comparatively lesser IR drop than Sample 6. As shown in FIG. 6, at a higher current density (1 A/g), Sample 2 sustains the symmetric charge and discharge cycle profile (more linear), but the profile of Sample 6 turns asymmetric (and curved), which shows cyclic instability. Also, there is a significant drop in specific capacitance for Sample 6 which also confirms this behavior (see Table 4).

Example 5

Figure 7:
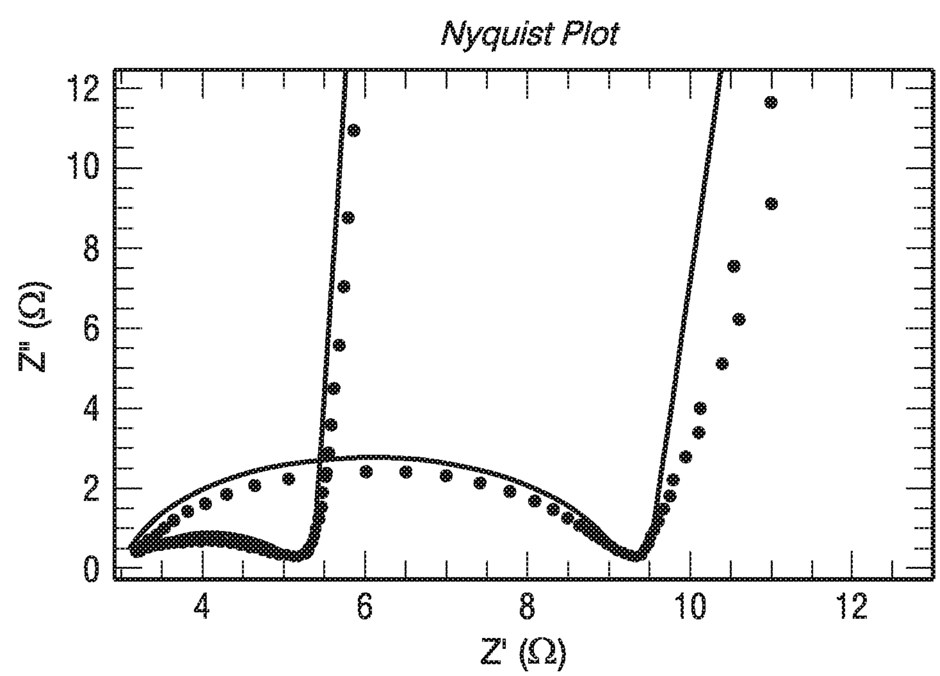
FIG. 7 is a Nyquist plot for electrodes including activated carbon particles alone or in combination with graphenic carbon particles.

Impedance spectroscopy was performed on electrodes containing activated carbon particles (Sample 1) and activated carbon particles with thermally produced graphenic carbon particles (Sample 2). The results are shown in the Nyquist plot of FIG. 7. With the addition of thermally produced graphenic carbon particles as an additive there is a decrease in impedance which indicates less resistance and leads to higher specific capacitance.

In accordance with embodiments of the invention, introducing thermally produced graphenic carbon particles effectively maintains the capacitance of activated carbon at high current densities and increases capacitance for thick electrodes by increasing overall electrical conductivity of the whole electrodes. Such an effect becomes less pronounced when highly conductive substrate is used. Also, such improvements are not limited to thermally produced graphenic carbon particles as commercial graphenic carbon particles such as M5 can also achieve similar results.

For purposes of this detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term “about”. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of “1 to 10” is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of “or” means “and/or” unless specifically stated otherwise, even though “and/or” may be explicitly used in certain instances.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. A supercapacitor electrode comprising:
a conductive foil substrate layer; and
electrode coating layers on opposite sides of the conductive foil substrate layer, wherein each electrode coating layer comprises:
from 50 to 95 weight percent active carbon particles;
from 1 to 10 weight percent thermally produced graphenic carbon particles comprising one or more layers of one-atom-thick planar sheets of $sp^2$-bonded carbon atoms densely packed in a honeycomb crystal lattice having an aspect ratio of greater than 3:1 and a B.E.T. specific surface area of at least 70 square meters per gram; and
from 1 to 15 weight percent binder.

2. The supercapacitor electrode of claim 1, wherein the active carbon particles comprise from 60 to 90 weight percent of each of the electrode coating layers.

3. The supercapacitor electrode of claim 1, wherein the thermally produced graphenic carbon particles comprise from 2 to 5 weight percent of each of the electrode coating layers.

4. The supercapacitor electrode of claim 1, wherein each of the electrode coating layers further comprises conductive carbon black in an amount of up to 20 weight percent of the electrode coating layer.

5. The supercapacitor electrode of claim 4, wherein the weight ratio of the thermally produced graphenic carbon particles to the conductive carbon black is 50 percent or less.

6. The supercapacitor electrode of claim 1, wherein the supercapacitor electrode has a specific capacitance of at least 100 F/g at a current density of 1 A/g.

7. The supercapacitor electrode of claim 1, wherein the supercapacitor electrode has a specific capacitance of at least 110 F/g at a current density of 1 A/g.

8. The supercapacitor electrode of claim 1, wherein the supercapacitor electrode has an energy density of at least 2 Wh/kg.

9. A supercapacitor comprising a supercapacitor electrode of claim 1.

10. The supercapacitor electrode of claim 1, wherein the graphenic carbon particles comprise one or more layers of one-atom-thick planar sheets of $sp^2$-bonded carbon atoms densely packed in a honeycomb crystal lattice having an aspect ratio of greater than 3:1 and a B.E.T. specific surface area of at least 70 square meters per gram.

11. The supercapacitor electrode of claim 10, wherein the graphenic carbon particles have an oxygen content of 2 atomic percent or less.

12. The supercapacitor electrode of claim 10, wherein at least a portion of the planar sheets of the graphenic carbon particles are curved, curled, creased or buckled.

13. An electrode coating comprising:

from 50 to 95 weight percent active carbon particles;

from 1 to 10 weight percent thermally produced graphenic carbon particles comprising one or more layers of one-atom-thick planar sheets of $sp^2$-bonded carbon atoms densely packed in a honeycomb crystal lattice having an aspect ratio of greater than 3:1 and a B.E.T. specific surface area of at least 70 square meters per gram; and from 1 to 15 weight percent binder.

14. An electrode coating of claim 13, wherein the graphenic carbon particles have an oxygen content of 2 atomic percent or less.

15. An electrode coating of claim 13, wherein at least a portion of the planar sheets of the graphenic carbon particles are curved, curled, creased or buckled.

* * * * *